Patented Aug. 24, 1954

2,687,382

UNITED STATES PATENT OFFICE 2,687,382

QUATERNARY AMMONIUM ION EXCHANGE RESINS

George B. Butler and Robert L. Bunch, Gainesville, Fla., assignors to Board of Commissioners of State Institutions of the State of Florida No Drawing. Application December 5, 1949, Serial No. 131,252

20 Claims. (Cl. 260—2.1)

This invention relates to the production of synthetic polymeric materials and to their use for the removal of anions from liquid media. The invention is concerned, more particularly, with compositions of matter comprising cross linked, insoluble polymerizates of unsaturated quaternary ammonium salts.

The object of this invention is to cause unsaturated quaternary ammonium compounds to polymerize to insoluble resins which are capable of absorbing negatively charged ions from solution. Resins of this type have the advantage over existing resins for similar applications in that they contain the strongly basic quaternary groups in contrast to the weakly basic amine groups, which are the basic groups in existing resins. The use of the strongly basic quaternary groups permits the absorption of negative ions from neutral solutions which is not possible in the case of those resins having the amine group as the basic group.

Resins of this type are useful when it is desirable to selectively remove the negative ion from solutions without first removing the positive ion. They are also useful in removing weak acid from solution, as well as in water treatment and purification. They also appear to be useful in the modern processes for manufacturing antibiotics such as penicillin and streptomycin, and in the separation of isotopes.

Resins containing the strongly basic quaternary groups have certain definite advantages over the products now being widely used. Among these advantages are: (1) an extension of the range of operation, for example, resins of this type will perform certain functions that have not heretofore been possible; (2) elimination of the necessity for using a series of resins in certain processes, since certain operations could be carried out with a resin of the type developed by applicants alone, whereas previously, two or more were required; (3) complete absorption of weakly acidic substances from solution, which has previously been impossible; and (4) reversal of the procedure in purification of water since these resins are capable of absorbing ions from neutral salts.

Resins of this type are prepared by causing an unsaturated quaternary ammonium salt, for example, diallyl morpholinium bromide, to polymerize under the influence of a catalyst to a water insoluble thermoset polymer. The resulting material upon treatment with an excess of a solution of aqueous potassium, sodium, or ammonium hydroxide is converted to the polyquaternary ammonium hydroxide. This polymer will remove selectively the negative ion from a neutral salt solution. For example, a solution of potassium chloride is converted to potassium hydroxide by treatment with this resin.

The preparation of these resins may be better understood by referring to the following reactions which start with the unpolymerized monomer. Each step through the treatment of a neutral salt with the polymerized resin is indicated.

Referring to the general reaction below, $n$ is equal to a number greater than or equal to 1, R represents alkyl, alkenyl, aralkyl, monocyclic, or heterocyclic radicals, at least two of the R groups being unsaturated, N represents a pentavalent nitrogen, and Br represents bromide, however, any of the other halogens being also satisfactory.

Tertiary-butyl (1) 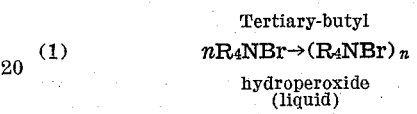
hydroperoxide
(liquid)

(The R groups may be equal or different but at least two groups are unsaturated.) (The thermoset polymer formed is washed free of soluble bromides.)

(2) 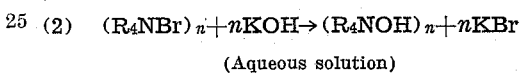

(Aqueous solution)

This reaction is continued until no halogen is present in the filtrate and the resin washed until a neutral filtrate is obtained.

(3) 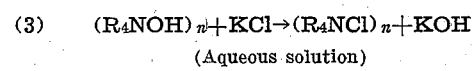

(Aqueous solution)

The rubbery polymer was removed by boiling with distilled water. The gel-like material failed to dissolve in water, but was broken down to small insoluble particles. After three complete washings of the product with hot distilled water, the filtrate did not give a test for bromides. The polymer was then treated with an excess of 1% potassium hydroxide, stirred at room temperature for several minutes, and filtered. The filtrate, after acidifying with halogen-free nitric acid, gave a precipitate of silver bromide upon addition of silver nitrate, showing that the polyquaternary ammonium bromide was converted to the polyquaternary ammonium hydroxide. Treatment with potassium hydroxide was continued until the acidified filtrate no longer gave a test for bromides indicating that replacement of the halogen with hydroxyl was complete. The product was washed with distilled water until a neutral filtrate was obtained. Upon treatment of the resin with a neutral solution of potassium chloride, a strongly basic filtrate was obtained, showing that the resin had removed the chloride ions from solution, and establishing the fact that the polyquaternary ammonium base is capable of serving as an ion-exchange resin with the ability to split neutral salts.

While the catalyst used in the preparation of the compounds claimed herein is indicated as being a peroxide catalyst, it has been found that other similar catalysts are equally effective in the preparation of these compounds.

Typical examples of the preparation and application of the resins of this type are as follows, although other materials of the general formula are operative:

*Example I*

One part of tetra-allyl ammonium bromide, 0.094 part of formamide and 0.022 part of 60% t-butyl hydroperoxide were mixed well and placed in an oven at 75° C. The mixture became dark brown and glassy within ten minutes. The temperature was held at 75° C. for twenty hours. The polymer was washed with hot water, a granular water insoluble substance being obtained. A yield of 76% was obtained. It was transformed into the hydroxide form with 1% sodium hydroxide. Similar results were obtained using water as a solvent.

*Example II*

One part of butyl triallyl ammonium bromide, 0.039 part of water and 0.011 part of 60% t-butyl hydroperoxide were mixed well and placed in an oven at 100° C. After twelve hours, the temperature was raised to 125° C. and held for twelve hours. On washing with hot water, 52.5% yield of a light brown, granular, water insoluble polymer was obtained. It can be converted to the hydroxide form with 1% sodium hydroxide.

*Example III*

Benzyl triallyl ammonium bromide will undergo polymerization under similar conditions to produce a water insoluble polymer. The polymer also may be converted to the hydroxide form with 1% sodium hydroxide.

*Example IV*

One part of butyl triallyl ammonium bromide, 1 part diallyl morpholinium bromide, 0.079 part of water and 0.044 part of 60% t-butyl hydroperoxide were mixed well. The mixture was heated in an oven at 100° C. for eighteen hours and at 125° C. for six hours. A hard, brittle, water insoluble polymer resulted. The polymer was converted to the hydroxide form with 1% sodium hydroxide.

*Example V*

One part of butyl triallyl ammonium bromide, 1 part of tetra-allyl ammonium bromide, 0.158 part of H2O and 0.044 part of 60% t-butyl hydroperoxide were mixed well and heated in an oven at 85° C. for thirteen hours, then at 110° C. for eleven hours. A light brown, brittle, water insoluble polymer was obtained. A yield of 67.5% was obtained after washing free of soluble materials and drying. The polymer can be converted to the hydroxide form with 1% sodium hydroxide.

*Example VI*

One part of benzyl triallyl ammonium bromide, 1 part of tetra-allyl ammonium bromide, 0.158 part of H2O and 0.044 part of 60% t-butyl hydroperoxide were heated in an oven at 80° C. for seventeen hours. The temperature was then raised to 110° C. and held for twelve hours. The polymer showed very little swelling in hot water, and 56.4% was water insoluble. The sample was transformed into the hydroxide form with 1% sodium hydroxide.

*Example VII*

One part of diallyl morpholinium bromide and 1 part of tetra-allyl ammonium bromide was heated in an oil bath to 100° C. Then 0.012 part of 60% t-butyl hydroperoxide was added. The temperature rose from 100° C. to 138° C., indicating polymerization. The polymer was washed with H2O and dried. A yield of 83% was obtained. The polymer was converted to the hydroxide form with 10% sodium hydroxide solution and then converted to the chloride form with sodium chloride solution.

*Example VIII*

One part of benzyl triallyl ammonium bromide and 1 part of diallyl di(B-methylallyl) piperazinium dibromide was fused at 100° C., then 0.006 part of 60% t-butyl hydroperoxide was added. Upon the addition of the catalyst the temperature rose from 100° C. to 132° C. A brown viscuous water insoluble polymer resulted.

*Example IX*

One part of tetra-allyl ammonium bromide and 1 part of diallyl piperidinium bromide was heated to 90° C. and then 0.006 part of 60% t-butyl hydroperoxide was added. The temperature rose from 90° C. to 132° C. A rubber-like substance resulted, which turned to a light brown powder on cooling. It was water insoluble.

*Example X*

Five parts of tetra-allyl ammonium bromide, 0.25 part of water, and 0.25 part of 30% hydrogen peroxide were mixed well and placed in an oven at 80° C. and allowed to remain for fourteen hours. Two parts of the resulting polymer was insoluble in water.

*Example XI*

Five parts of tetra-allyl ammonium bromide, 0.2 part of water, and 0.5 part of sodium carbonate peroxide were mixed well and placed in an oven at 110° C. and allowed to remain for twelve hours. After washing thoroughly with water, one part of the resulting polymer was insoluble in water.

We claim:

1. A process for preparing strongly basic water insoluble polyquaternary ammonium ion-exchange resins which comprises polymerizing through its carbon to carbon unsaturation and with the aid of a peroxide catalyst, an unsaturated quaternary ammonium halide having at least two unsaturated low molecular weight alkenyl groups attached to the pentavalent nitrogen with the remaining nitrogen valences being satisfied by a member of the group consisting of low molecular weight alkyl, low molecular weight alkenyl, and aralkyl and converting the resulting polymer to the free base form by treating with a base selected from the group consisting of sodium hydroxide, potassium hydroxide and ammonium hydroxide.

2. A process for preparing water insoluble strongly basic polyquaternary ammonium ion-exchange resins which comprises copolymerizing through their carbon to carbon unsaturation and with the aid of a peroxide catalyst, at least two unsaturated quaternary ammonium halides having at least two unsaturated low molecular weight alkenyl groups attached to the pentavalent nitrogen with the remaining nitrogen valences being satisfied by a member of the group consisting of low molecular weight alkyl, low molecular weight alkenyl, and aralkyl and converting the resulting copolymer to the free base form by treating with a base selected from the group consisting of sodium hydroxide, potassium hydroxide and ammonium hydroxide.

3. A neutral, water insoluble cross linked polyquaternary polymerizate of a mass comprising at least one quaternary ammonium halide having at least two low molecular weight unsaturated alkenyl radicals attached to the pentavalent nitrogen with the remaining nitrogen valences being satisfied by a member of the group consisting of low molecular weight alkyl, low molecular weight alkenyl, and aralkyl.

4. A process for preparing water insoluble strongly basic polyquaternary ammonium ion-exchange resins which comprises copolymerizing through their carbon to carbon unsaturation and with the aid of a peroxide catalyst, (1) an unsaturated quaternary ammonium halide having at least two unsaturated low molecular weight alkenyl groups attached to the pentavalent nitrogen with the remaining nitrogen valences being satisfied by a member of the group consisting of low molecular weight alkyl, low molecular weight alkenyl, and aralkyl and (2) an unsaturated quaternary ammonium halide having the general formula

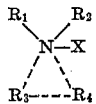

wherein $R_1$ and $R_2$ are low molecular weight alkenyl radicals, X is a halogen and $R_3$ and $R_4$ constitute the groups necessary to complete a 6 member heterocyclic radical, and converting the resulting copolymer to the free base form by treating with a base selected from the group consisting of sodium hydroxide, potassium hydroxide and ammonium hydroxide.

5. A process according to claim 4 in which one of the unsaturated quaternary ammonium halides is diallyl morpholinium bromide and the other unsaturated quaternary ammonium halide is tetra-allyl ammonium bromide.

6. A process according to claim 4 in which one of the unsaturated quaternary ammonium halides is diallyl di (B-methylallyl) piperazinium dibromide and the other unsaturated quaternary ammonium halide is benzyl triallyl ammonium bromide.

7. A process according to claim 1 in which the unsaturated quaternary ammonium halide is butyl triallyl ammonium bromide.

8. A process according to claim 1, in which the unsaturated quaternary ammonium halide is tetra-allyl ammonium bromide.

9. An insoluble, cross linked, polymerizate of an unsaturated quaternary ammonium salt having the general formula

and the free bases thereof wherein $R_1$ and $R_2$ are low molecular weight alkenyl radicals, $R_3$ and $R_4$ are radicals from the group consisting of low molecular weight alkyl, low molecular weight alkenyl and aralkyl radicals and X is a halogen.

10. An insoluble, cross linked polymerizate of a mixture comprising an unsaturated quaternary ammonium salt having the general formula

wherein $R_1$ and $R_2$ are low molecular weight alkenyl radicals, $R_3$ and $R_4$ are radicals from the group consisting of low molecular weight alkyl, low molecular weight alkenyl and aralkyl radicals and X is a halogen, and an unsaturated quaternary ammonium salt having the general formula

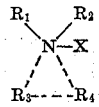

wherein $R_1$ and $R_2$ are low molecular weight alkenyl radicals, X is a halogen and $R_3$ and $R_4$ constitute the groups necessary to complete a 6 member heterocyclic radical.

11. An insoluble, cross linked polymerizate of a mixture comprising tetra-allyl ammonium bromide and butyl triallyl ammonium bromide.

12. An insoluble, cross linked polymerizate of a mixture comprising benzyl triallyl ammonium bromide, and tetra-allyl ammonium bromide.

13. An insoluble, cross linked polymerizate of a mixture comprising diallyl morpholinium bromide and tetra-allyl ammonium bromide.

14. An insoluble, cross linked polymerizate of a mixture comprising tetra-allyl ammonium bromide and diallyl piperidinium bromide.

15. An insoluble, cross linked polymerizate of a mass comprising tetra-allyl ammonium bromide.

16. An insoluble, cross linked polymerizate of a mass comprising benzyl triallyl ammonium bromide.

17. The method of treating liquid media to remove anions therefrom which comprises contacting such media with an insoluble, cross linked polymerizate of an unsaturated quaternary ammonium salt having the general formula

wherein $R_1$ and $R_2$ are low molecular weight alkenyl radicals, $R_3$ and $R_4$ are radicals from the group consisting of low molecular weight alkyl, low molecular weight alkenyl and aralkyl radicals and X is a halogen, said polymerizate having anion exchange properties and being present in quantity sufficient to effect substantially complete removal of anions from said liquid media, and separating said polymerizates from the liquid media.

18. The method of treating liquid media to remove anions therefrom which comprises contacting such media with an insoluble, cross linked polymerizate of a mixture comprising an unsaturated quaternary ammonium salt having the general formula

wherein $R_1$ and $R_2$ are low molecular weight alkenyl radicals, $R_3$ and $R_4$ are radicals from the group consisting of low molecular weight alkyl, low molecular weight alkenyl and aralkyl radicals and X is a halogen, and an unsaturated quaternary ammonium salt having the general formula

wherein $R_1$ and $R_2$ are low molecular weight alkenyl radicals, X is a halogen and $R_3$ and $R_4$ constitute the groups necessary to complete a 6 member heterocyclic radical, said polymerizate having anion exchange properties and being present in quantity sufficient to effect substantially complete removal of anions from said liquid media, and separating said polymerizates from the liquid media.

19. The method of treating liquid media to remove anions therefrom which comprises contacting such media with an insoluble, cross linked polymerizate of a mixture comprising tetra-allyl ammonium bromide and triallyl ammonium bromide, said polymerizate having anion exchange properties and being present in quantity sufficient to effect substantially complete removal of anions from said liquid media, and separating said polymerizates from the liquid media.

20. The method of treating liquid media to remove anions therefrom which comprises contacting such media with an insoluble, cross linked polymerizate of a mixture comprising benzyl triallyl ammonium bromide, and tetra-allyl ammonium bromide, said polymerizate having anion exchange properties and being present in quantity sufficient to effect substantially complete removal of anions from said liquid media, and separating said polymerizates from the liquid media.

References Cited in the file of this patent

UNITED STATES PATENTS

| Number | Name | Date |
|---|---|---|
| 2,228,514 | Griessbach | Jan. 14, 1941 |
| 2,294,764 | Urbain et al. | Sept. 1, 1942 |
| 2,301,669 | Richter | Nov. 10, 1942 |
| 2,484,423 | Reynolds et al. | Oct. 11, 1949 |
| 2,484,430 | Sprague | Oct. 11, 1949 |
| 2,486,191 | Minsk et al. | Oct. 25, 1949 |
| 2,540,984 | Jackson | Feb. 6, 1951 |
| 2,543,666 | Michael | Feb. 27, 1951 |
| 2,559,529 | Bauman | July 3, 1951 |
| 2,611,768 | Butler | Sept. 23, 1952 |

OTHER REFERENCES

Fuoss, Jour. Polymer Science, vol. 4, April 1949, pages 97–120 (pages 106–107 of especial interest).